United States Patent
Jolly et al.

(10) Patent No.: US 11,444,897 B2
(45) Date of Patent: Sep. 13, 2022

(54) SYSTEM AND METHOD FOR PROVIDING PRIVACY CONTROL TO MESSAGE BASED COMMUNICATIONS

(71) Applicant: CRYPTOMILL INC., Haggatt Hall (BB)

(72) Inventors: Nandini Jolly, Toronto (CA); Chris Batty, Toronto (CA); Canute Serrao, Toronto (CA); Deepu Filji, Toronto (CA); David Dai, Toronto (CA)

(73) Assignee: CRYPTOMILL INC., Haggat Hall (BB)

( * ) Notice: Subject to any disclaimer, the term of this patent is extended or adjusted under 35 U.S.C. 154(b) by 0 days.

(21) Appl. No.: 15/742,731

(22) PCT Filed: Jul. 5, 2016

(86) PCT No.: PCT/CA2016/050783
§ 371 (c)(1),
(2) Date: Jan. 8, 2018

(87) PCT Pub. No.: WO2017/004711
PCT Pub. Date: Jan. 12, 2017

(65) Prior Publication Data
US 2018/0205686 A1 Jul. 19, 2018

Related U.S. Application Data

(60) Provisional application No. 62/188,951, filed on Jul. 6, 2015.

(51) Int. Cl.
*H04L 51/00* (2022.01)
*H04L 9/08* (2006.01)
(Continued)

(52) U.S. Cl.
CPC .............. *H04L 51/12* (2013.01); *H04L 9/083* (2013.01); *H04L 9/321* (2013.01);
(Continued)

(58) Field of Classification Search
CPC ......... H04L 51/12; H04L 9/083; H04L 9/321; H04L 63/0428; H04L 63/0435; H04L 63/062; H04L 63/101
See application file for complete search history.

(56) References Cited

U.S. PATENT DOCUMENTS 7,246,378 B1   7/2007 Marvit et al.
8,583,911 B1 * 11/2013 Miller ................. H04L 63/0428
                                                          713/150
(Continued)

OTHER PUBLICATIONS

Wanda et al., "Efficient Message Security Based Hyper Elliptic Curve Cryptosystem (HECC) for Mobile Instant Messenger", Nov. 2014, The 1st International Conference on Information Technology, Computer, and Electrical Engineering, pp. 245-249 (Year: 2014).*
(Continued)

*Primary Examiner* — Kenneth W Chang
(74) *Attorney, Agent, or Firm* — Leber IP Law; David C. Robertson

(57) ABSTRACT

A system and method for controlling access to a message after communication. A sender sends an encrypted message to a recipient. The sender also sends an encryption key and the identity of the recipient to a services component. The recipient authenticates its access rights with the services component to obtain the encryption key. The key is held for a period of time for the recipient to access the encrypted message. The recipient may re-authenticate with the services component to again obtain the key to subsequently access the message. The sender may revoke or reinstate the receiver's access to the message by updating the service component.

11 Claims, 7 Drawing Sheets

Top-Level Context

100

(51) Int. Cl.
*H04L 9/32* (2006.01)
*H04L 9/40* (2022.01)

(52) U.S. Cl.
CPC ...... *H04L 63/0428* (2013.01); *H04L 63/0435* (2013.01); *H04L 63/062* (2013.01); *H04L 63/101* (2013.01)

(56) References Cited

U.S. PATENT DOCUMENTS

| | | | | |
|---|---|---|---|---|
| 8,707,454 | B1* | 4/2014 | Statica | H04L 63/0421 726/28 |
| 9,584,316 | B1* | 2/2017 | Statica | H04L 63/0853 |
| 9,654,288 | B1* | 5/2017 | Howell | H04L 9/14 |
| 2003/0147536 | A1* | 8/2003 | Andivahis | H04L 63/06 380/277 |
| 2004/0148356 | A1* | 7/2004 | Bishop, Jr. | H04L 51/38 709/206 |
| 2004/0196978 | A1* | 10/2004 | Godfrey | G06Q 10/107 380/270 |
| 2005/0160292 | A1* | 7/2005 | Batthish | H04L 63/0823 726/5 |
| 2007/0073823 | A1* | 3/2007 | Cohen | G06Q 10/107 709/207 |
| 2007/0294533 | A1* | 12/2007 | Toh | H04L 63/061 713/170 |
| 2008/0086646 | A1* | 4/2008 | Pizano | H04L 63/061 713/182 |
| 2010/0017593 | A1* | 1/2010 | Putz | H04L 9/3073 713/150 |
| 2010/0017619 | A1* | 1/2010 | Errico | G06F 21/32 713/186 |
| 2012/0109830 | A1* | 5/2012 | Vogel | G06Q 20/382 705/75 |
| 2012/0210134 | A1* | 8/2012 | Mitter | G06F 21/10 713/171 |
| 2013/0305040 | A1* | 11/2013 | Lee | H04L 9/32 713/155 |
| 2014/0068262 | A1* | 3/2014 | Robertson | H04L 63/0428 713/168 |
| 2015/0358260 | A1* | 12/2015 | Jordan | H04L 51/046 709/206 |
| 2016/0135020 | A1* | 5/2016 | Moshir | H04W 4/14 455/466 |
| 2016/0314115 | A1* | 10/2016 | Windebank | G06F 17/289 |

OTHER PUBLICATIONS

International Search Report and Written Opinion issued in International Application No. PCT/CA2016/050783.

International Preliminary Report on Patentability issued in International Application No. PCT/CA2016/050783.

* cited by examiner

FIG. 1

Top-Level Context

Flowchart: Composing a Message

Flowchart: Receiving a Message

Flowchart: Checking Read Status

FIG. 5

Flowchart: Recalling a Message

Flowchart: Revoking a Recipient from a Message

Protected Message Data Format

700

SYSTEM AND METHOD FOR PROVIDING PRIVACY CONTROL TO MESSAGE BASED COMMUNICATIONS

CROSS REFERENCE TO RELATED APPLICATIONS

This application claims the benefit of priority of U.S. Provisional Patent Application No. 62/188,951 filed Jul. 6, 2015, which is hereby incorporated by reference in its entirety.

FIELD

The embodiments disclosed herein relate generally to the field of data security and information privacy, and more specifically to a method of securely sending data communications (for example, email messages) such that only the designated recipient is able to read the message, but is not permitted to share the communication with others.

BACKGROUND

Across various industries, data security is an ever increasing concern. The protection of information is an important concern for corporations, individuals, and other legal entities. Corporations, for example, generally deal with vast amounts of sensitive information whether it be customer lists, personal information of clients, trade-secrets or other sensitive information. It is important to keep such information safe and secure. It is also desirable to share such information between authorized persons but still maintain some control over the information once it has been shared. It is, therefore, desirable to provide a method and system for providing such control to message based communications.

BRIEF DESCRIPTION OF THE DRAWINGS

Embodiments of the present disclosure will now be described, by way of example only, with reference to the attached figures.

Other aspects and features of the present disclosure will become apparent to those ordinarily skilled in the art upon review of the following description of specific embodiments in conjunction with the accompanying figures.

DETAILED DESCRIPTION

Various embodiments described herein provide the ability for individuals to send messages to specified recipients, ensuring that the message content is private, cannot be forwarded onto others, and optionally expiring after viewing has occurred. Some of the embodiments disclosed herein can allow a user to be able to confidently communicate potentially sensitive messages, without worrying about the content getting into the hands of anyone but the intended recipient. Various of the embodiments disclosed herein are useful to individuals either working on their own, or in small-to-large organizations, in any field of endeavor.

Some embodiments disclosed herein provide controls over the data communication after it has been received by the recipient. Embodiments of the disclosed system and method prevent the message from being forwarded to others. In various embodiments, where possible on specific platforms, actions which make a copy of message content (e.g. select text and copy to a clipboard, screen shot capture) are disabled. Similarly, side-effects of message transmission which may copy message content (e.g. caching of files attached to an email) are mitigated by bringing all attached data in-line, into the message itself.

In addition, in some embodiments, the sender has the option of specifying whether or not that the message will self-destruct such that it is automatically removed from memory a period of time after the recipient has reviewed or accessed the message. Various of the embodiments disclosed herein provides the ability to audit whether or not the recipient has read a sent message, as well as providing the ability to recall the message, effectively withdrawing the recipient's ability to view the message.

Figure 1:
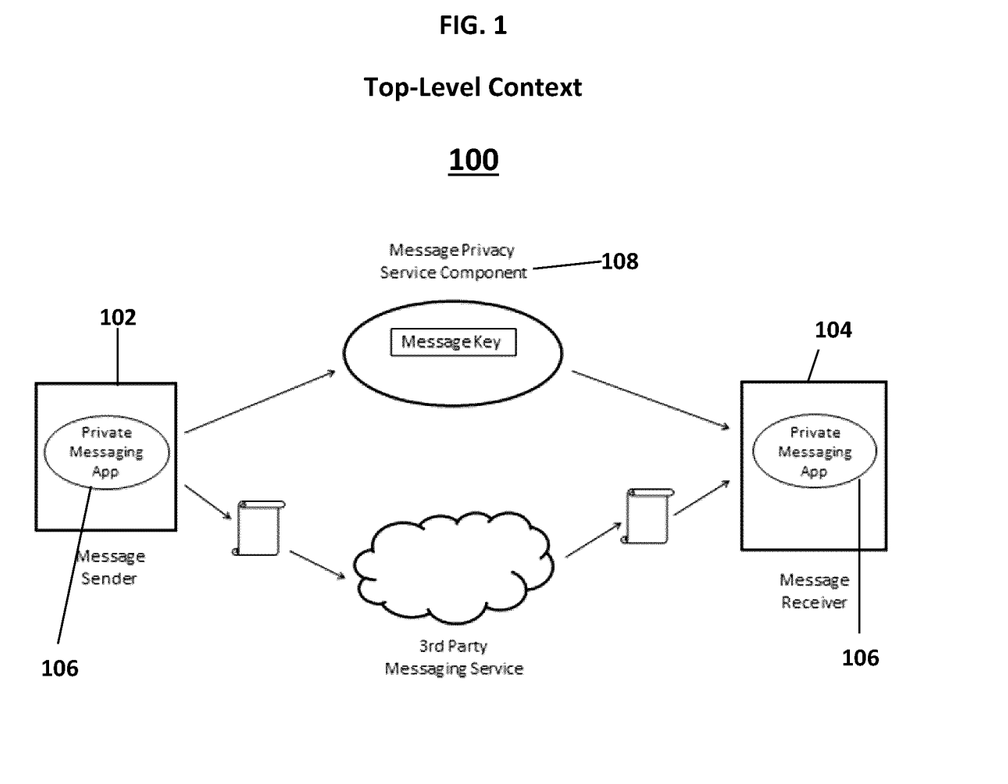
FIG. 1 is a schematic diagram illustrating the top-level Context Model of an example embodiment.

Reference is made to FIG. 1, where the top-level Context Model 100 of an example embodiment of the present invention is shown. The various elements of this context are described below.

Two computing devices 102, 104 are shown, each containing an instance of the private messaging application software 106. The term "computing devices" as used herein can include, but is not limited to, a desktop computer, a laptop, a notebook computer, a tablet, a smart phone, phablet or any other suitable computing or mobile communications device. Accordingly, various of the embodiments disclosed herein can be used with a variety of different types of computing devices while some embodiments are specific to a given type of computing device. One of the computing devices represents the message sender role 102, the other computing device represents the message receiver role 104. When sending a message, the private messaging application 106 encrypts the message contents, sends the encryption key to the messaging privacy service component, and then sends the encrypted message to the recipient. The recipient, upon receiving the encrypted message, contacts the messaging privacy service component 108 to obtain the encryption key for the service. In various embodiments, the message privacy service component 108 comprises a computing device, such as for example, a server. The various computing devices can communicate through one or more networks, including, for example but not limited to, the internet, wireless networks, and cellular networks.

The following paragraphs example use cases where users interact with various of the embodiments disclosed herein. These serve to illustrate typical uses and the utility provided by some of the embodiments.

Setting Up the Application

In an example embodiment, in order to use the disclosed features, the user downloads an application, such as a mobile application, for their computing device. Once the application is downloaded, it will ask the user to provide credentials for their email account. In some embodiments, the user's email account credentials are stored on their device, and are used to send protected private emails through that email account.

As a security and user-acceptance feature, in some embodiments, the user's email account credentials are never sent to the service component.

Once the user has provided their email account credentials, they proceed to set up an account on the service component. In some embodiments, the user provides a separate, new account password for the service. In various embodiments, the service account password is hashed and salted before being stored in the service components data store.

Using the Application to Compose and Send

Using the application, the user can now compose a message (e.g. email) and send it. By clicking the "Send" button, the application creates a new unique encryption key and encrypts the message with it. The message can have attachments such as image files or other files. The encryption key and the target recipient list is then sent to the message privacy service component 108. In various embodiments, only the recipients of the email, and the user, can request the key from the message privacy service component 108. In some embodiments, for security and privacy reasons, at no point are the message contents sent to the message privacy service component—not even in encrypted form. The user's (encrypted) message is then sent via the regular messaging account to its recipients.

Figure 2:
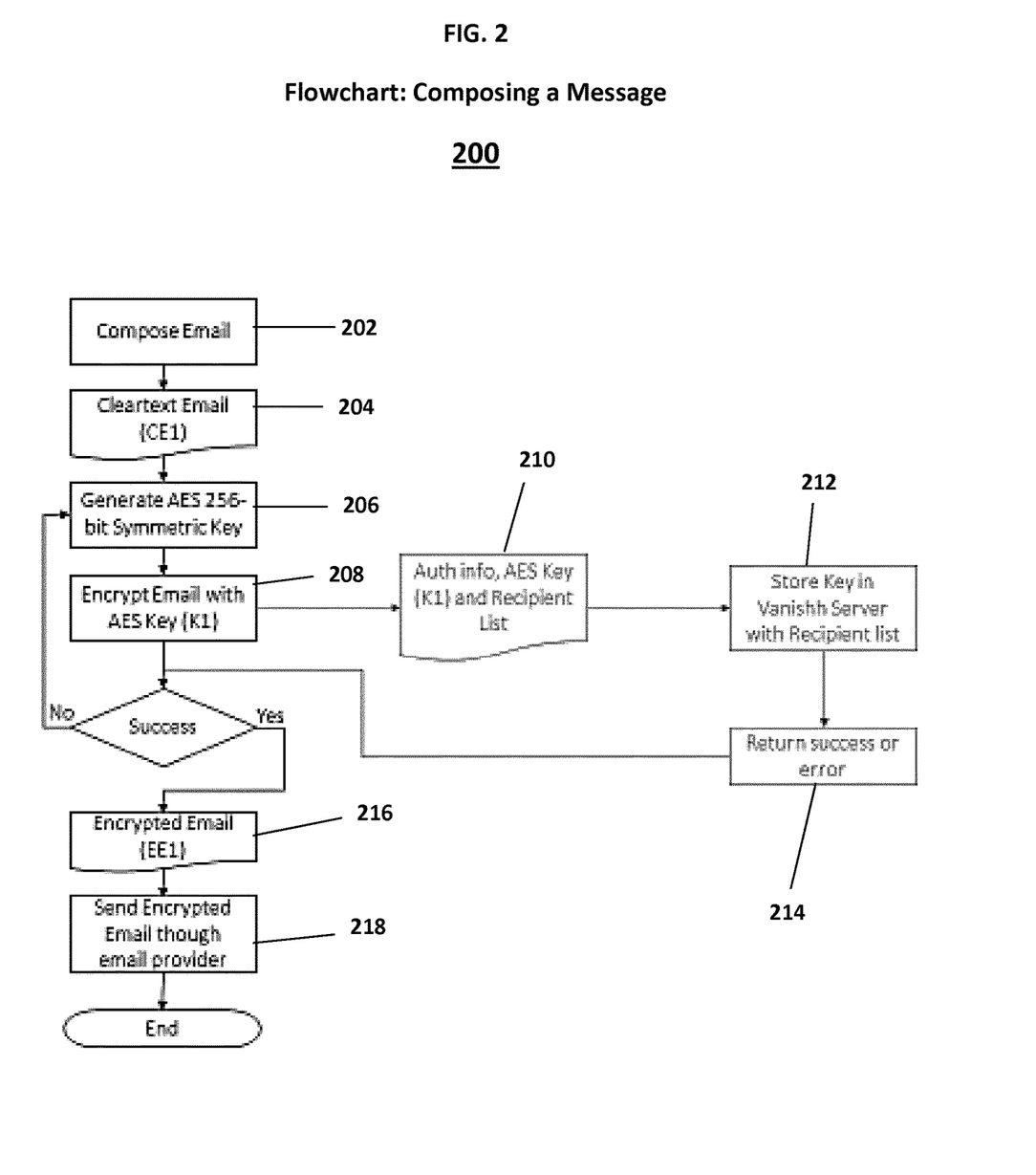
FIG. 2 is a flow chart illustrating a method of composing a message, according to an embodiment.

Reference is made to FIG. 2, which is a flowchart 200 illustrating a method of composing a message, according to an embodiment. The method may be carried out by software executed, for example, by a physical processor of the sender's computing device 102. Coding of software for carrying out such a method is within the scope of a person of ordinary skill in the art given the present description. The method may contain additional or fewer processes than shown and/or described, and may be performed in a different order. Computer-readable code executable by at least one processor of the system to perform the method may be stored in a computer-readable storage medium device or apparatus, which may be a non-transitory or tangible storage medium.

In an embodiment, the user composes a message 202 in the private messaging application, specifying the desired recipients. In some embodiments, upon selecting the Send action, the application generates a 256-bit random number 206 to be used as an AES 256-bit key, K1. In other embodiments, a different sized random number and key are used. The message body is encrypted 208 using the AES key K1. The application then transmits the AES Key K1 and the recipient list 210 to the message privacy service component 108. The message privacy service component 108 assigns a unique ID to the message, and records the message ID, key K1 and recipient list in its database 212. The message ID is returned 214 to the private messaging application 108. Upon successful feedback from the message privacy service component 108, the private messaging application proceeds to encrypt 216 the message, and then passes that message on to User's messaging service provider 218. The messaging service provider distributes the message as it normally does.

Using the Application to View Messages

In some embodiments, a recipient who receives an encrypted message protected by the present invention will also receive instructions describing how to download and install the corresponding mobile application. If the user has already installed the application, they can use the application to open the message to read it. At this point, their application contacts the message privacy service component 108 and requests the cryptographic key corresponding to that particular message. Upon receiving such a request, the message privacy service component 108 poses an authentication challenge to the requesting user, verifying their service account password. After successfully authenticating, the service component 108 furnishes the cryptographic key for the message. Their application holds the message key temporarily, while using it to decrypt the message.

For messages marked for expiry, the application displays the message to the recipient for the time period, which in some embodiments can be set by the sender. In some embodiments, the sender can specify a specific expiry time for the message. In some embodiments, the user can specify that the message can be only be viewed for a maximum length of time by the receiver. For example, in an embodiment the message can be viewed for a maximum 20 seconds. In various embodiments, the user can select the amount of time. In some embodiments, the system may suggest a length of time to the sender given the length of the message. In some embodiments, the message can be viewed only once and only for the maximum time period. Accordingly, in such embodiments, if the viewer opens the message and views it for less than the maximum time period before closing it, they will not be able to view the message again despite the fact that they have not viewed it for the full maximum time period. After the time period has passed, the application closes the message display, and immediately 'forgets' the message key. For example, in some embodiments, the encryption key is stored on a server and when the message expires the key is erased from the server. For messages that have had their viewing time period expire, if the recipient tries to open the message again, the service component will refuse to send them the message key.

In some embodiments, the recipient receives a notification indicating that they have received an encrypted message. In some embodiments, the notification indicates whether the message is set to expire. The notification may also indicate the length of the time period for which the message may be viewed.

In some embodiments, a countdown indicator is displayed for messages that are set to expire. In some embodiments, the countdown indicator is a countdown bar that is displayed in relation to the message. The countdown indicator can, for example, display a length of time or the number of times which the message can be viewed. In an embodiment where the countdown indicator displays a length of time, the countdown indicator is displayed and updated while the recipient views the message allowing him/her to see how much longer they can view the message.

Figure 3:
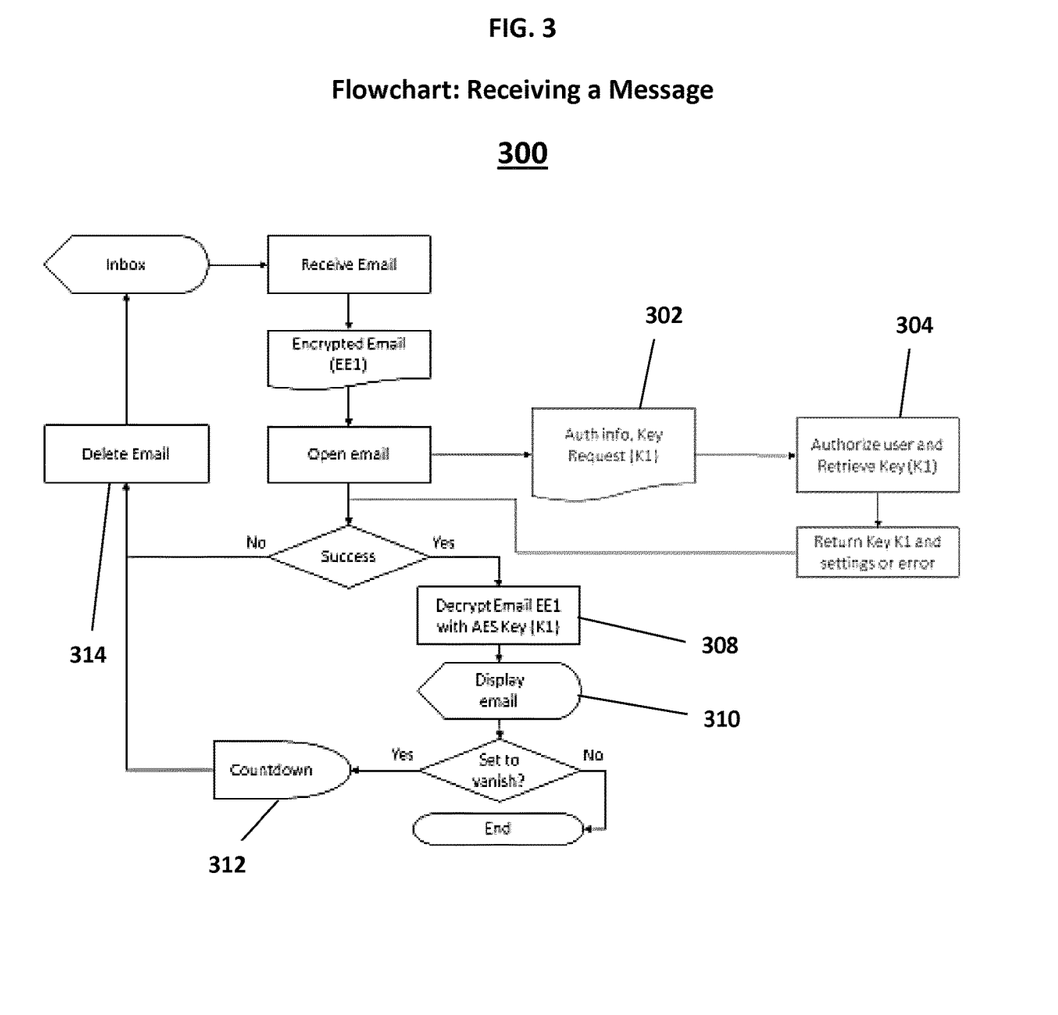
FIG. 3 is a flowchart diagram illustrating a method of receiving a message, according to an embodiment.

Reference is made to FIG. 3, which is a flowchart diagram illustrating a method of receiving a message 300, according to an embodiment. The method 300 may be carried out by software executed, for example, by a physical processor of the receiver's computing devices 104. Coding of software for carrying out such a method is within the scope of a person of ordinary skill in the art given the present description. The method may contain additional or fewer processes than shown and/or described, and may be performed in a different order. Computer-readable code executable by at least one processor of the system to perform the method 300 may be stored in a computer-readable storage medium device or apparatus, which may be a non-transitory or tangible storage medium.

The receiving user runs the private messaging application to read a protected message that has been received. The encrypted email is scanned to determine its message ID. The private messaging application contacts the message privacy service component 108, supplying the message ID and message privacy service authentication info 302. The message privacy service component authenticates 304 the user and determines if that user account is authorized to read the specified message. Any user account that is in the message's recipient list is so authorized. If authorized, the message Key K1 is retrieved, and passed back to the private messaging application 306. Upon receipt of the message Key K1, the private messaging application decrypts 308 the message, and then displays it to the user on the screen of the computing device 310. If the message metadata indicates that the message has an expiry time, a countdown timer is started 312. Otherwise, the message remains displayed until the user closes the message. After the countdown timer reaches zero, the message is automatically deleted 314.

Using the Application to Check Read Status

In some embodiments, the sending user can obtain a listing of messages that they have sent in the past. The application provides this information under a Sent Items' area. In some embodiments, if the user selects a particular message that they have sent previously, they can also check to see which of their recipients have read that message, and if so, when the most recent access occurred.

Figure 4:
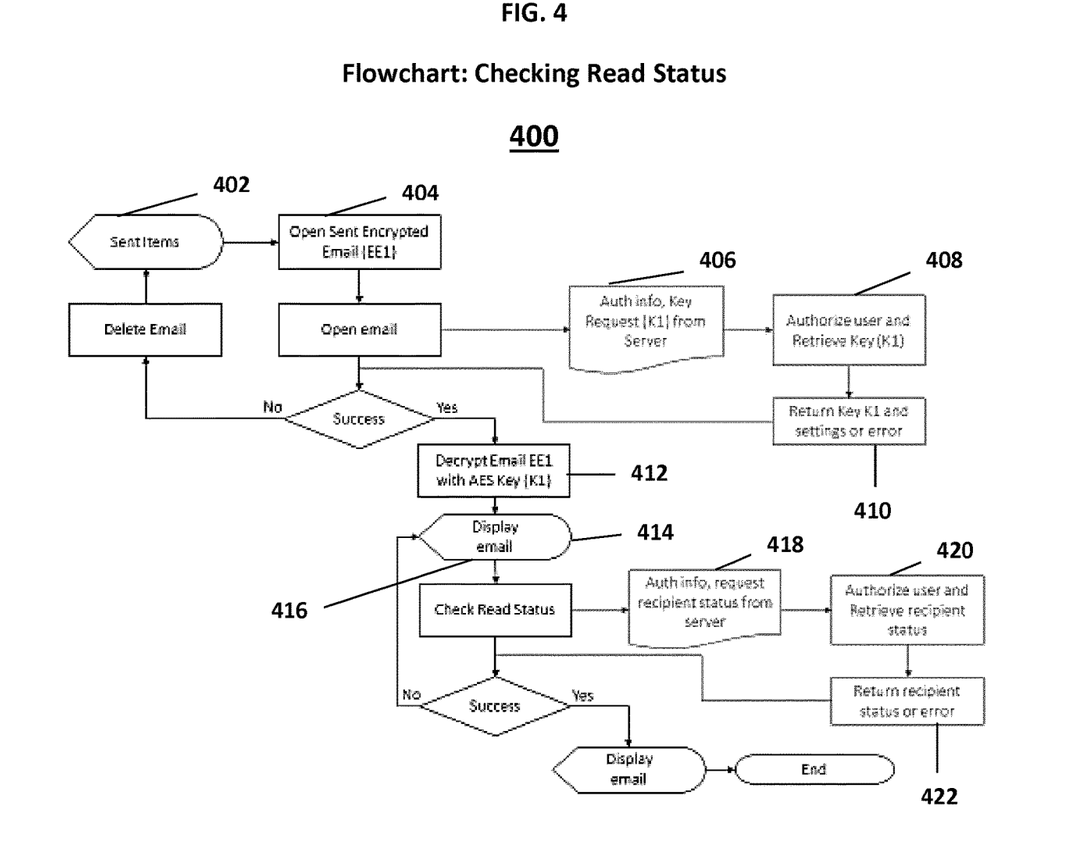
FIG. 4 is a flowchart diagram illustrating a method of checking a read status, according to an embodiment.

Reference is made to FIG. 4, which is a flowchart diagram illustrating a method of checking a read status 400, according to an embodiment. The method 400 may be carried out by software executed, for example, by physical processors of the sender's 102 and receiver's 104 computing devices. Coding of software for carrying out such a method is within the scope of a person of ordinary skill in the art given the present description. The method may contain additional or fewer processes than shown and/or described, and may be performed in a different order. Computer-readable code executable by at least one processor of the system to perform the method may be stored in a computer-readable storage medium device or apparatus, which may be a non-transitory or tangible storage medium.

Navigating through the list of Sent Items 402, a user can select a previously-sent message for checking read status. The message is first opened 404, using a process similar to that used when Receiving a Message. The selected encrypted message is scanned to determine its message ID. The private messaging application contacts the message privacy service component 108, supplying the message ID and message privacy service authentication info 406. The message privacy service component authenticates the user and determines if that user account is authorized to read the specified message 408. In various embodiments, any user account that is in the message's recipient list is so authorized. If authorized, the message Key K1 is retrieved, and passed back to the private messaging application 410. Upon receipt of the message Key K1, the private messaging application decrypts the message 412, and then displays it to the user 414. When reviewing the message, the user has the option to check the read status 416.

The private messaging application contacts the message privacy service component 108, supplying the message ID and message privacy service authentication info 418. The message privacy service component authenticates the user and then fetches the recipient read status 420 for all users in the messages recipient list. In some embodiments, only the user that sent the message can be authenticated to view the read status of the message. This read status is passed back 422 to the private messaging application. The private messaging application then displays the read status.

Using the Application to Recall a Message

In addition, in some embodiments, the sending user is able to recall the message, making it ineligible for future reading. As a result, any recipient that has not already read the message, will no longer be able to read it. When recalling a message, the message privacy service component erases the key that was used to encrypt the message.

Figure 5:
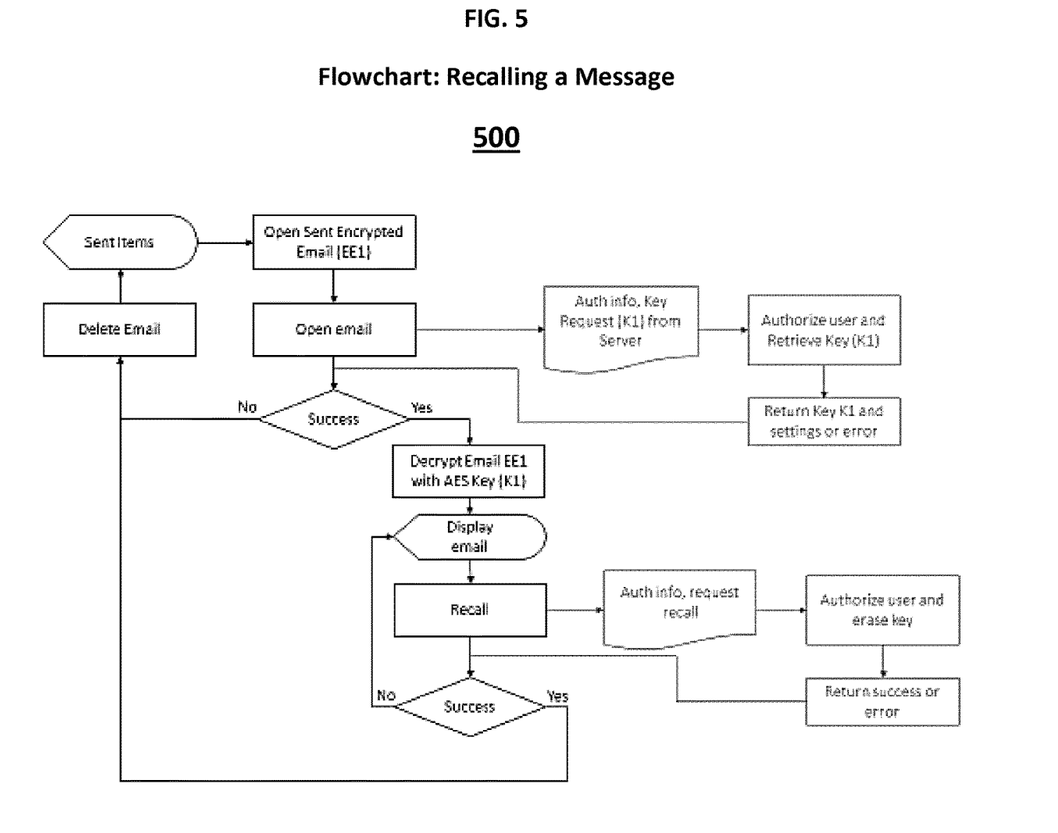
FIG. 5 is a flow chart diagram illustrating the process of recalling a message, according to an embodiment.

Reference is made to FIG. 5, which is a flow chart diagram illustrating the process of recalling a message 500, according to an embodiment. The method may be carried out by software executed, for example, by physical processors of the sender's 102 and receiver's 104 computing devices. Coding of software for carrying out such a method is within the scope of a person of ordinary skill in the art given the present description. The method may contain additional or fewer processes than shown and/or described, and may be performed in a different order. Computer-readable code executable by at least one processor of the system to perform the method may be stored in a computer-readable storage medium device or apparatus, which may be a non-transitory or tangible storage medium. The message sender has the ability to recall a message. This action renders the message no longer readable.

Using the Application to Revoke a User

In some embodiments, the sending user is provided with the option of selectably revoking one or more recipients from the message recipient list. This feature provides the sending user with the option of selecting a particular recipient and making the message ineligible for further reading by that recipient. With this option, other recipients are unaffected by the revoke action. As a result, if the selected recipient hasn't already read the message, they will not be able to read it at all.

Figure 6:
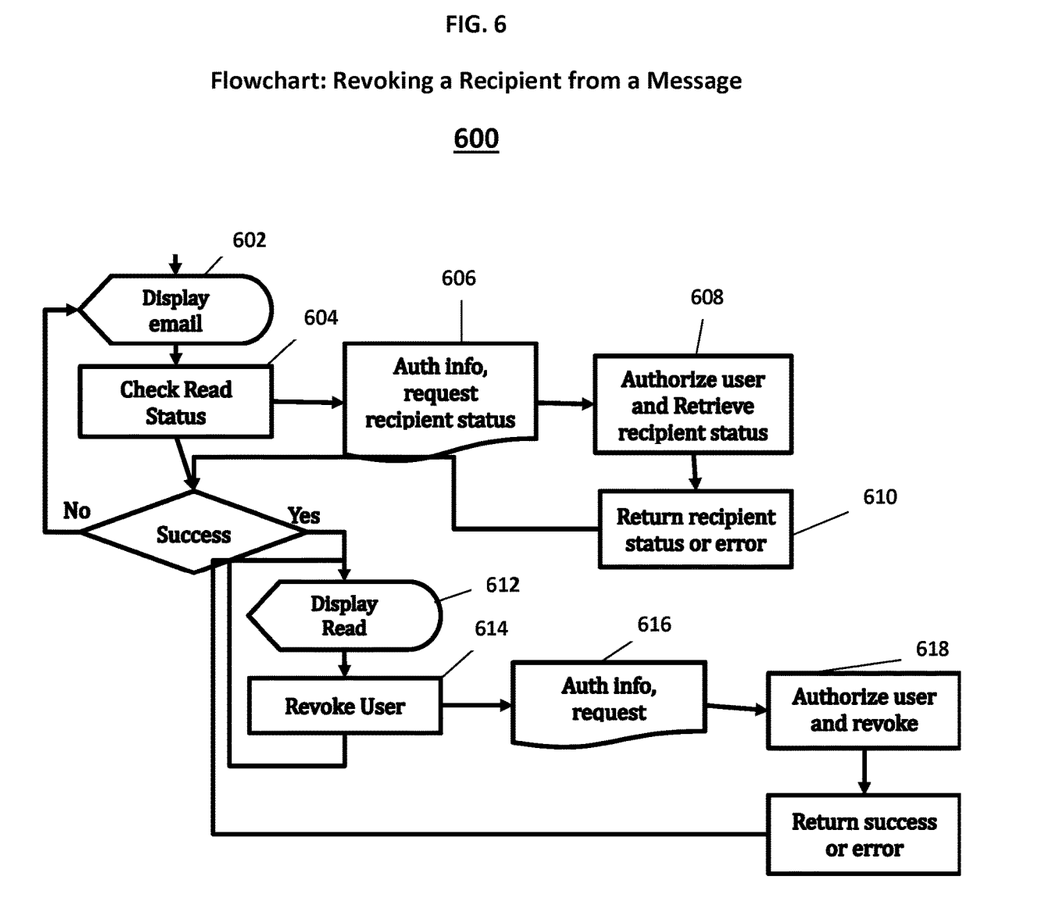
FIG. 6 is a flowchart diagram illustrating the process of recalling a message, according to an embodiment.

Reference is made to FIG. 6, which is a flowchart diagram illustrating the process of recalling a message 600, according to an embodiment. The method may be carried out by software executed, for example, by physical processors of the sender's 102 and receiver's 104 computing devices. Coding of software for carrying out such a method is within the scope of a person of ordinary skill in the art given the present description. The method may contain additional or fewer processes than shown and/or described, and may be performed in a different order. Computer-readable code executable by at least one processor of the system to perform the method may be stored in a computer-readable storage medium device or apparatus, which may be a non-transitory or tangible storage medium.

When displaying a message 602, the user may check the read status 604. The request for read status on the specified message ID, along with the user authentication information, is sent 606 to the message privacy service component 108. The service determines if the user is authorized 608 to obtain read status information pertaining to the message, and if so, returns 610 that information. Upon receipt of the read status information, the private messaging application will display the read status 612, with one entry for each recipient. For each recipient shown, the option is made available to revoke 614 that user from the authorized recipient list. If the user chooses this option, a request is made 616, to the message privacy service component 108, to revoke the selected user. This request, along with user authentication information, is sent to the message privacy service component 108 to perform this revoke action 618. Upon successful completion, this action renders the message no longer readable by the specified recipient.

Protected Message Data Format

Figure 7:
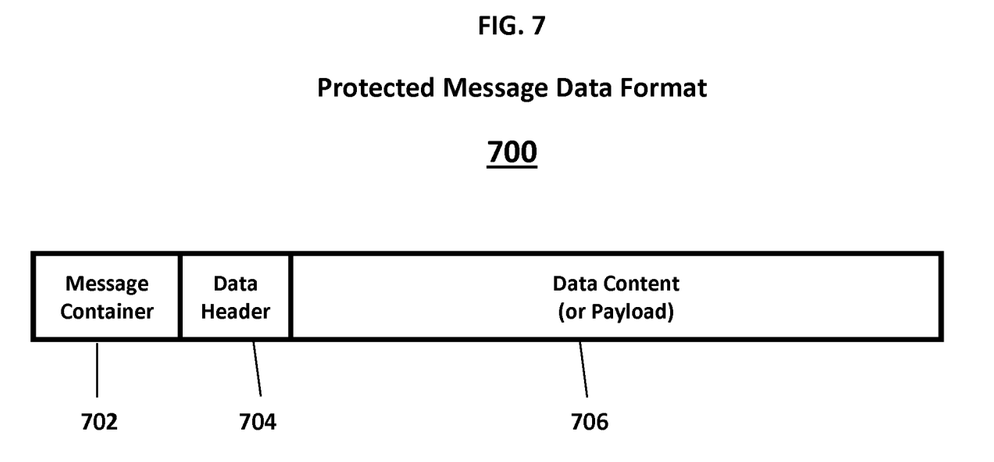
FIG. 7 is a schematic diagram illustrating a Protected Message Data Format according to an embodiment.

Reference is made to FIG. 7, which illustrates the data format of a Protected Message, according to an embodiment.

In the example embodiment, a protected message 700 is composed of three distinct parts:

Message Container 702
Data Header 704
Data Content (or payload) 706

The actual placement and ordering of these parts 702, 704, 706, within the overall message data, is not important to the overall functioning of the embodiments disclosed herein.

In various embodiments, the Message Container 702 is simply the skeleton or envelope that allows the private message to be sent and transported through the usual, regular messaging system. For example, if the messaging system is SMTP Email, the message container is a validly formatted SMTP-compatible email body. The actual encoded message would be contained within this envelope.

In some embodiments, the Data Header 704 serves to identify the message as a protected message, and provides a unique Message ID.

In various embodiments, the Data Content 706 is the part of the protected message that contains the encryption payload. The Data Content 706 is the same size as the original unencrypted message. The Data Content 706 is encrypted using the Data Encryption Key (DEK). The Data Encryption Key is a random number value, generated prior to the message being sent.

Seamless Access and Transparency
Email-Based Approach

To meet the need for transparent secured message distribution, an example embodiment of the present invention protects data within a standard message format used by the messaging system. This allows for the transport of the encrypted message through arbitrarily complex messaging systems, without the need for involvement by the third parties.

Transparent Message Encryption

This same example embodiment of the present invention encrypts messages deemed to be sensitive when they are sent from the computing device. So that there are no extra steps or interruptions to normal use, this encryption (and any subsequent decryption) is performed "on-the-fly". This is also known as "transparent encryption/decryption"—emphasizing that the user is not aware that the data transformation (plaintext to ciphertext, or ciphertext to plaintext) is happening. This is achieved by encrypting the message data as it is sent out, and decrypting it as a message is opened. In the present disclosure, this transparent encryption and decryption takes place, so long as the protected data is being accessed by the legitimate recipient, who must be in possession of, or be able to obtain, the appropriate cryptographic key for that particular message. Otherwise, to all other parties and actors, the message can be merely moved around, or copied, as an opaque, but otherwise meaningless, stream of bytes.

Cryptographic Security
Key Management

In some embodiments, when an email is sent, the list of people to whom the email is addressed (the "recipient list") is transmitted, along with the Message Key, to the message privacy service component. When suitably stored, the message privacy service component returns a Message ID for the message.

In some embodiments, to retrieve the Message Key, the recipient's private messaging application performs the following:

a) Successfully authenticate to the message privacy service component using a valid user account and password, and b) Furnish the Message ID of the desired message.

In some embodiments, only if the specified message contains the requesting User's ID in its recipient list, will the Message Key be returned to the recipient's private messaging application.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for electronic messaging, the method comprising:

generating, using a first messaging application running on a first user device, an encryption key for encrypting messages and a list of recipients authorized to view messages encrypted with the encryption key;

encrypting a message using the first messaging application and the encryption key;

sending the entirety of the encryption key as a message key, and the list of recipients, to a privacy service component communicatively coupled to the first user device and storing on the privacy service component;

receiving the encrypted message in a second messaging application running on a second user device;

verifying, on the privacy service component, whether a user of the second messaging application is on the list of recipients, and receiving from the privacy service component the entirety of the message key at the second messaging application in response to the user being on the list of recipients, decrypting the encrypted message with the entirety of the message key received from the privacy service component.

2. The method of claim 1 wherein the encrypted message includes a unique message ID assigned by the privacy service component.

3. The method of claim 1 wherein the encrypted message includes a maximum length of time that the encrypted message can be viewed in clear through the second messaging application.

4. The method of claim 3 wherein the maximum length of time is 20 seconds.

5. The method of claim 3 wherein upon exceeding the maximum length of time for viewing the encrypted message in clear, the second messaging application is configured to forget the message key or delete the encrypted message.

6. The method of claim 3 wherein the second messaging application displays a countdown indicator for indicating an amount of time remaining to view the encrypted message in clear.

7. The method of claim 1 wherein the first messaging application can selectively recall the encrypted message from the second messaging application.

8. The method of claim 1 wherein the first messaging application can selectively revoke a recipient from the recipient list.

9. A system for encrypting and decrypting messages, the system comprising:
   a user computing device comprising a processor and a memory,
   a private messaging application stored in the memory of the user computing device, the private messaging application configured to run on the processor of the user computing device, the private messaging application having a send configuration and a receive configuration:
      the send configuration for generating send encryption keys as message keys for encrypting send messages and for generating a list of recipients authorized to view the send messages, and
      the receive configuration for receiving specific encrypted messages, receiving the entirety of each encryption key as message keys in respect of the specific encrypted messages, decrypting each of the specific encrypted messages with the entirety of the corresponding message key and for viewing encrypted messages in the clear, and
   a privacy service component for communicating with a plurality of user computing devices having the private messaging application, the privacy service component for receiving and storing the entirety of a message key associated with a corresponding list of recipients for one or more messages, and for verifying requests to obtain the entirety of the message key in respect of specific messages.

10. A method for electronic messaging, the method comprising:
   generating with a first messaging application running on a first user device an encryption key for encrypting messages;
   sending the entirety of the encryption key and a list of recipients to a privacy service component communicatively coupled to the first user device;
   receiving a unique message ID from the privacy service component;
   associating a message to the list of recipients with the unique message ID, and encrypting the message using the first messaging application and the encryption key; and
   providing the encrypted message to a messaging service provider.

11. The method of claim 10, wherein the first messaging application sends the privacy service component a revoke action request in respect of a specific recipient on the list of recipients.

* * * * *